United States Patent
Lu et al.

(10) Patent No.: US 9,161,197 B2
(45) Date of Patent: Oct. 13, 2015

(54) EMERGENCY CALL PROCESSING METHOD AND RELATED APPARATUS AND SYSTEM

(71) Applicant: Huawei Technologies Co., LTD, Shenzhen (CN)

(72) Inventors: Wenzhuo Lu, Shenzhen (CN); Jingjin Mei, Shanghai (CN); Shaofeng Fu, Xi'an (CN)

(73) Assignee: Huawei Technologies Co., Ltd., Shenzhen (CN)

(*) Notice: Subject to any disclaimer, the term of this patent is extended or adjusted under 35 U.S.C. 154(b) by 120 days.

(21) Appl. No.: 14/017,006

(22) Filed: Sep. 3, 2013

(65) Prior Publication Data

US 2014/0004813 A1 Jan. 2, 2014

Related U.S. Application Data

(63) Continuation of application No. PCT/CN2012/070837, filed on Feb. 2, 2012.

(30) Foreign Application Priority Data

Mar. 3, 2011 (CN) .......................... 2011 1 0051347

(51) Int. Cl.
*H04M 11/04* (2006.01)
*H04W 4/22* (2009.01)
(Continued)

(52) U.S. Cl.
CPC .............. *H04W 4/22* (2013.01); *H04M 3/5116* (2013.01); *H04W 4/023* (2013.01); *H04W 4/08* (2013.01); *H04W 76/007* (2013.01)

(58) Field of Classification Search
CPC ..... H04W 4/22; H04W 76/007; H04W 76/02; H04W 88/02; H04M 11/04; H04M 15/7652

USPC ........ 455/456.2, 404.1, 439, 413, 404.2, 406, 455/411, 436, 458, 552.1; 370/310, 331, 370/332, 352
See application file for complete search history.

(56) References Cited

U.S. PATENT DOCUMENTS 5,559,860 A * 9/1996 Mizikovsky .................. 455/413
6,185,412 B1 2/2001 Pentikaeinen et al.
(Continued)

FOREIGN PATENT DOCUMENTS

| CN | 1238892 A | 12/1999 |
|---|---|---|
| CN | 1783918 A | 6/2006 |

(Continued)

OTHER PUBLICATIONS

International Search Report and Written Opinion received in Application No. PCT/CN2012/070837, mailed May 17, 2012, 12 pages.
(Continued)

*Primary Examiner* — Joseph Arevalo
(74) *Attorney, Agent, or Firm* — Slater & Matsil, L.L.P.

(57) ABSTRACT

An emergency call processing method, a related apparatus and system, are used to construct a simplified emergency call center in a disaster site. An embodiment of the present invention includes: receiving, by an emergency call processing terminal receives, through a base station BTS, an emergency call request sent from a user terminal. The call processing terminal seeks, in a locally-stored emergency mobile terminal group, for a mobile terminal of which a session state is idle, and transfers the emergency call request to the mobile terminal through the BTS, so that the user terminal establishes, with the mobile terminal, a call connection.

21 Claims, 6 Drawing Sheets

(51) Int. Cl.
*H04M 3/51* (2006.01)
*H04W 4/02* (2009.01)
*H04W 76/00* (2009.01)
*H04W 4/08* (2009.01)

(56) References Cited

U.S. PATENT DOCUMENTS

| | | | |
|---|---|---|---|
| 6,192,232 B1* | 2/2001 | Iseyama | 455/404.1 |
| 2002/0044062 A1* | 4/2002 | Yoshioka | 340/636 |
| 2002/0075165 A1* | 6/2002 | Yoshioka et al. | 340/901 |
| 2005/0003797 A1 | 1/2005 | Baldwin | |
| 2005/0197096 A1* | 9/2005 | Yang et al. | 455/404.1 |
| 2006/0087993 A1* | 4/2006 | Sengupta et al. | 370/310 |
| 2006/0221941 A1* | 10/2006 | Kishinsky et al. | 370/352 |
| 2009/0004997 A1 | 1/2009 | Allen et al. | |
| 2010/0144370 A1* | 6/2010 | Jang | 455/456.2 |

FOREIGN PATENT DOCUMENTS

| | | |
|---|---|---|
| CN | 101179619 A | 5/2008 |
| CN | 101815258 A | 8/2010 |
| CN | 101917693 A | 12/2010 |
| CN | 102118723 | 7/2011 |
| CN | 102118723 A | 7/2011 |

OTHER PUBLICATIONS

International Search Report received in Application No. PCT/CN2012/070837, mailed May 15, 2012, 6 pages.

Extended European Search Report received in Application No. 12752156.5-1870 mailed Mar. 24, 2014, 6 pages.

* cited by examiner

_US 9,161,197 B2_

EMERGENCY CALL PROCESSING METHOD AND RELATED APPARATUS AND SYSTEM

CROSS-REFERENCE TO RELATED APPLICATIONS

This application is a continuation of International Application No. PCT/CN2012/070837, filed on Feb. 2, 2012, which claims priority to Chinese Patent Application No. 201110051347.5, filed on Mar. 3, 2011, both of which are hereby incorporated by reference in their entireties.

TECHNICAL FIELD

The present invention relates to the field of mobile communications, and in particular, to an emergency call processing method, a related apparatus and system.

BACKGROUND

In a disaster site, a victim or a rescuer usually needs to dial an emergency call (for example, 120 or 122), the emergency call such as 120 or 122 is generally implemented in a fixed network, but in the disaster site, a fixed network terminal usually cannot be used to dial an agent terminal of an emergency call center, so the victim or the rescuer needs to dial the emergency call through a mobile terminal.

In the prior art, intercommunication between the fixed network and a network such as a global system for mobile communications (GSM) needs numerous network element devices, has complicated architecture, and is difficult to be implemented. Basic network element devices required for making a call between a conventional mobile terminal and the agent terminal of the emergency call center are: a base station, a base station controller, a mobile switching center, a fixed network, and an agent terminal, which form architecture shown in FIG. 1.

In order to improve rescue efficiency, an emergency call center may need to be established locally in the disaster site, so as to directly obtain a local emergency call and perform processing on the emergency call. However, if the emergency call center is constructed by using the foregoing conventional standard network architecture, implementation may be difficult due to numerous involved network element devices.

SUMMARY OF THE INVENTION

Multiple aspects of the present invention provide an emergency call processing method, a related apparatus and system, which are used to construct a simplified emergency call center in a disaster site, so as to improve efficiency of disaster relief.

An emergency call processing method is provided in one aspect of the present invention. An emergency call processing terminal receives, through a base station, an emergency call request sent from a user terminal. The emergency call processing terminal searches, in a locally-stored emergency mobile terminal group, for a mobile terminal of which a session state is idle. The emergency call processing terminal transfers the emergency call request to the mobile terminal through the base station so that the user terminal establishes a call connection with the mobile terminal.

An emergency call processing apparatus is provided in another aspect of the present invention. A receiving unit is configured to receive, through a base station, an emergency call request sent from a user terminal. A searching unit is configured to search, in a locally-stored emergency mobile terminal group, for a mobile terminal of which a session state is idle. A transferring unit is configured to transfer the emergency call request to the mobile terminal through the base station, so that the user terminal establishes a call connection with the mobile terminal.

An emergency call processing system is provided in another aspect of the present invention. An emergency call processing terminal communicates with a mobile terminal through a base station. The emergency call processing terminal is configured to receive, through the base station, an emergency call request sent from a user terminal, to search, in a locally-stored emergency mobile terminal group, for a mobile terminal of which a session state is idle, and to transfer the emergency call request to the mobile terminal through the base station so that the user terminal establishes a call connection with the mobile terminal. The base station is configured to transfer, to the emergency call processing terminal, the emergency call request sent from the user terminal and to transfer the emergency call request to a mobile terminal designated by the emergency call processing terminal, so that the user terminal establishes a call connection with the mobile terminal. The mobile terminal is configured to establish the call connection with the user terminal.

It may be seen from the foregoing technical solutions that, in the foregoing technical solutions, architecture of a constructed emergency call center may be completed by using only the base station, the emergency call processing terminal and the mobile terminal. When the user terminal sends the emergency call request, the emergency call processing terminal receives the emergency call request through the base station, searches for the mobile terminal of which the session state is idle, and transfers the emergency call request to an idle mobile terminal through the BTS, thereby completing establishment of a call. Not only the foregoing technical solutions have simple architecture and are easy to be implemented, but also a constructed answering terminal is a mobile terminal, which is convenient for a rescue team to respond to a help request timely and rapidly, thereby improving the efficiency of disaster relief.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

Embodiments of the present invention provide an emergency call processing method, a related apparatus and system, which are used to construct a simplified emergency call center in a disaster site, so as to improve efficiency of disaster relief.

Figure 1:
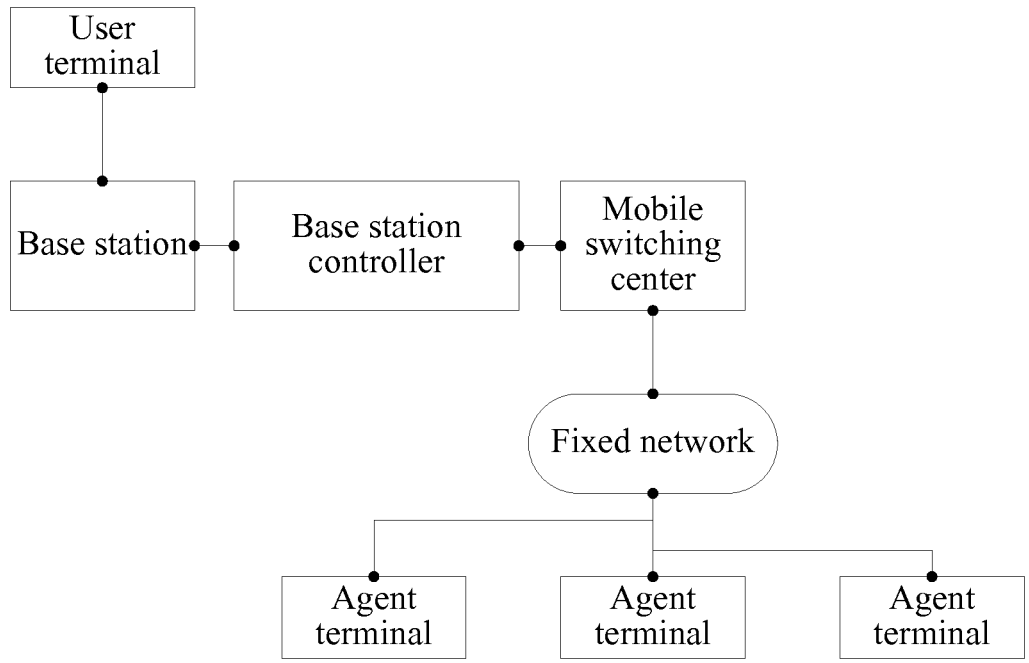
FIG. 1 is a schematic diagram of a logical structure of emergency call architecture in the prior art.
Figure 2:
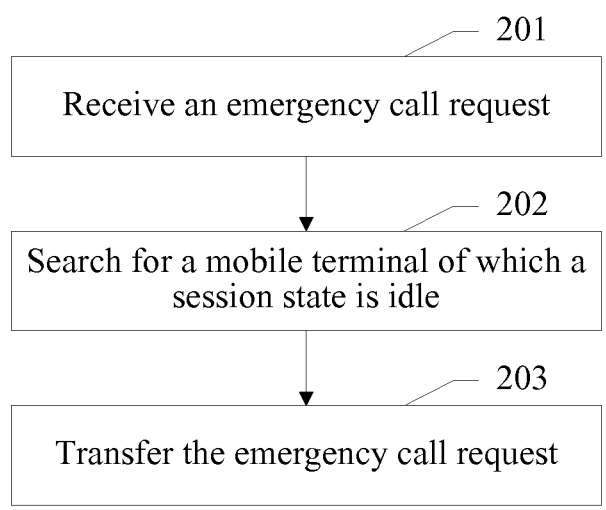
FIG. 2 is a schematic flow chart of an emergency call processing method according to an embodiment of the present invention.

Referring to FIG. 2, an embodiment of an emergency call processing method in an embodiment of the present invention is shown.

201: Receive an emergency call request.

An emergency call processing terminal receives, through a base station (BTS), an emergency call request sent from a user terminal.

The emergency call processing terminal may set several numbers as emergency call numbers, and when the user terminal dials these emergency call numbers, the emergency call processing terminal performs corresponding emergency call processing (as described in subsequent steps).

At the same time, the emergency call processing terminal may also use some emergency calls specified in a GSM. A call of this kind has signaling different from signaling of an ordinary call. An emergency call request of this kind carries an emergency call identifier. When a user dials this kind of number carrying the emergency call identifier, the emergency call processing terminal also performs the corresponding emergency call processing.

202: Search for a mobile terminal of which a session state is idle.

The emergency call processing terminal searches, in a locally-stored emergency mobile terminal group, for the mobile terminal of which the session state is idle.

In the emergency call processing terminal in the present invention, several mobile terminals used by disaster relief teams may be managed. The emergency call processing terminal stores international mobile subscriber identities (IMSI) of the several mobile terminals, and establishes an emergency mobile terminal group. These mobile terminals are separately carried by the disaster relief teams responsible for disaster relief. The emergency call processing terminal associates each number in the emergency mobile terminal group to a corresponding emergency call number.

Optionally, the emergency call processing terminal may also establish an emergency mobile terminal group for each kind of disaster relief team, and associate all numbers in the emergency mobile terminal group to a corresponding emergency call number. For example, it may associate all numbers of mobile terminals of a medical disaster relief team to 120, and associate all numbers of mobile terminals of a traffic disaster relief team to 122.

The emergency call processing terminal may further record a session state of each mobile terminal in the emergency mobile terminal group, make a distinction by identifying two session states, idle and busy, and when transferring the emergency call request, randomly perform searching and transferring in the mobile terminal of which the session state is idle.

Optionally, when the mobile terminal of which the session state is idle is searched for, each idle mobile terminal and the user terminal may be positioned (for example, positioned by using a global positioning system), and then a distance from the user terminal to each idle mobile terminal is compared, to find a mobile terminal closest to the user terminal.

203: Transfer the emergency call request.

The emergency call processing terminal transfers, through the BTS, the emergency call request to the mobile terminal of which the session state is idle, and establishes a call connection.

When the mobile terminal of which the session state is idle is found through 202, the emergency call processing terminal transfers, through the BTS, the emergency call request to a mobile terminal designated by the emergency call processing terminal, so that the user terminal establishes, with the designated mobile terminal, a call connection.

During a process of searching, if all mobile terminals in the emergency mobile terminal group are in a busy session state, the emergency call request may keep being in a waiting state to wait for an idle mobile terminal, and may also perform another operation, which is specifically illustrated in a subsequent embodiment.

The embodiment of the present invention is applicable to various mobile communications systems, such as a GSM system, a code division multiple access (CDMA) system, and a wideband code division multiple access (WCDMA) system. Which communications system an emergency call center in the present invention is specifically constructed in may depend on a network used by the mobile terminal mentioned in the embodiment of the present invention, and is not limited here.

Architecture of the emergency call center constructed in the present invention may be completed by using only the base station, the emergency call processing terminal and the mobile terminal. When the user terminal sends the emergency call request, the emergency call processing terminal receives the emergency call request through the base station, searches for the mobile terminal of which the session state is idle, and transfers the emergency call request to the idle mobile terminal through the BTS, thereby completing establishment of a call. Not only the technical solution of the present invention has simple architecture and is easy to be implemented, but also a constructed answering terminal is a mobile terminal, which is convenient for a rescue team to respond to a help request timely and rapidly, thereby improving efficiency of disaster relief.

Figure 3:
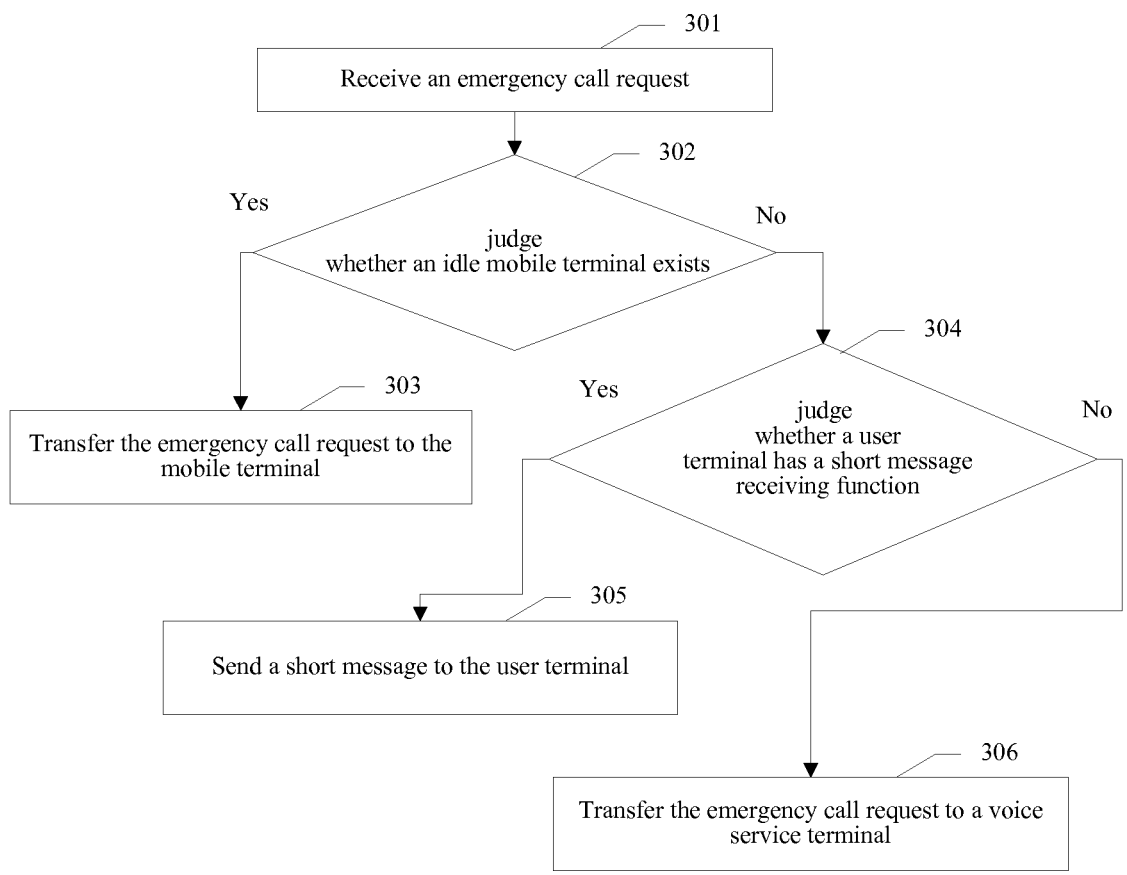
FIG. 3 is another schematic flow chart of an emergency call processing method according to an embodiment of the present invention.

During a process of searching for a mobile terminal, if all mobile terminals in an emergency mobile terminal group are in a busy session state, a corresponding processing solution is also provided in an embodiment of the present invention, and referring to FIG. 3, an embodiment of an emergency call processing method in the embodiment of the present invention is shown.

301: Receive an emergency call request.

An emergency call processing terminal receives, through a base station (BTS), an emergency call request sent from a user terminal.

The emergency call processing terminal may set several numbers as emergency call numbers, and when the user terminal dials these emergency call numbers, the emergency call processing terminal performs corresponding emergency call processing (as described in subsequent steps).

At the same time, the emergency call processing terminal may also use some emergency calls specified in a GSM, a call of this kind has signaling different from signaling of an ordinary call, an emergency call request of this kind carries an emergency call identifier, and when a user dials this kind of number carrying the emergency call identifier, the emergency call processing terminal also performs the corresponding emergency call processing.

302: Judge whether an idle mobile terminal exists.

The emergency call processing terminal determines whether a mobile terminal of which a session state is idle exists in a locally-stored emergency mobile terminal group. If the mobile terminal of which the session state is idle exists, 303 is triggered. If the mobile terminal of which the session state is idle does not exist, 304 is triggered.

303: Transfer the emergency call request to a mobile terminal.

When the mobile terminal of which the session state is idle exists in the locally-stored emergency mobile terminal group, the emergency call processing terminal designates one mobile terminal in the mobile terminal of which the session state is idle, and transfers, through the BTS, the emergency call request to the mobile terminal designated by the emergency call processing terminal, so that the user terminal establishes, with the designated mobile terminal, a call connection.

304: Judge whether the user terminal has a short message receiving function.

The emergency call processing terminal determines whether the user terminal has the short message receiving function (for example: determines whether the user terminal is a fixed-line terminal or a mobile terminal). If the user terminal has the short message receiving function, 305 is triggered. If the user terminal does not have the short message receiving function, 306 is triggered.

305: Send a short message to the user terminal.

The emergency call processing terminal sends the short message to the user terminal, to notify the user terminal that the emergency call processing terminal is busy.

The emergency call processing terminal in the present invention presets a function of automatically replying with a short message, and when all mobile terminals in the emergency mobile terminal group are in a busy session state, the emergency call processing terminal replies to the user terminal with a short message, and content of the short message is prompt content, which may be used to give a prompt of currently being busy and/or of a subsequent operation procedure.

306: Transfer the emergency call request to a voice service terminal.

The emergency call processing terminal transfers the emergency call request to a voice service terminal of the emergency call processing terminal, establishes a call connection, and notifies, through the voice service terminal, the user terminal that the emergency call processing terminal is busy.

The emergency call processing terminal in the present invention includes the voice service terminal, and the voice service terminal may be an automatic voice service terminal, or a human voice service terminal. When the emergency call request is transferred to the voice service terminal of the emergency call processing terminal, if it is an automatic voice service terminal, a reply of the prompt content is given to the user; and if it is a human voice service terminal, a staff member in an emergency call center provides a service for the user.

Optionally, in the embodiment of the present invention, the emergency call request may be directly transferred to the voice service terminal of the emergency call processing terminal without the judgment in 304.

Figure 4:
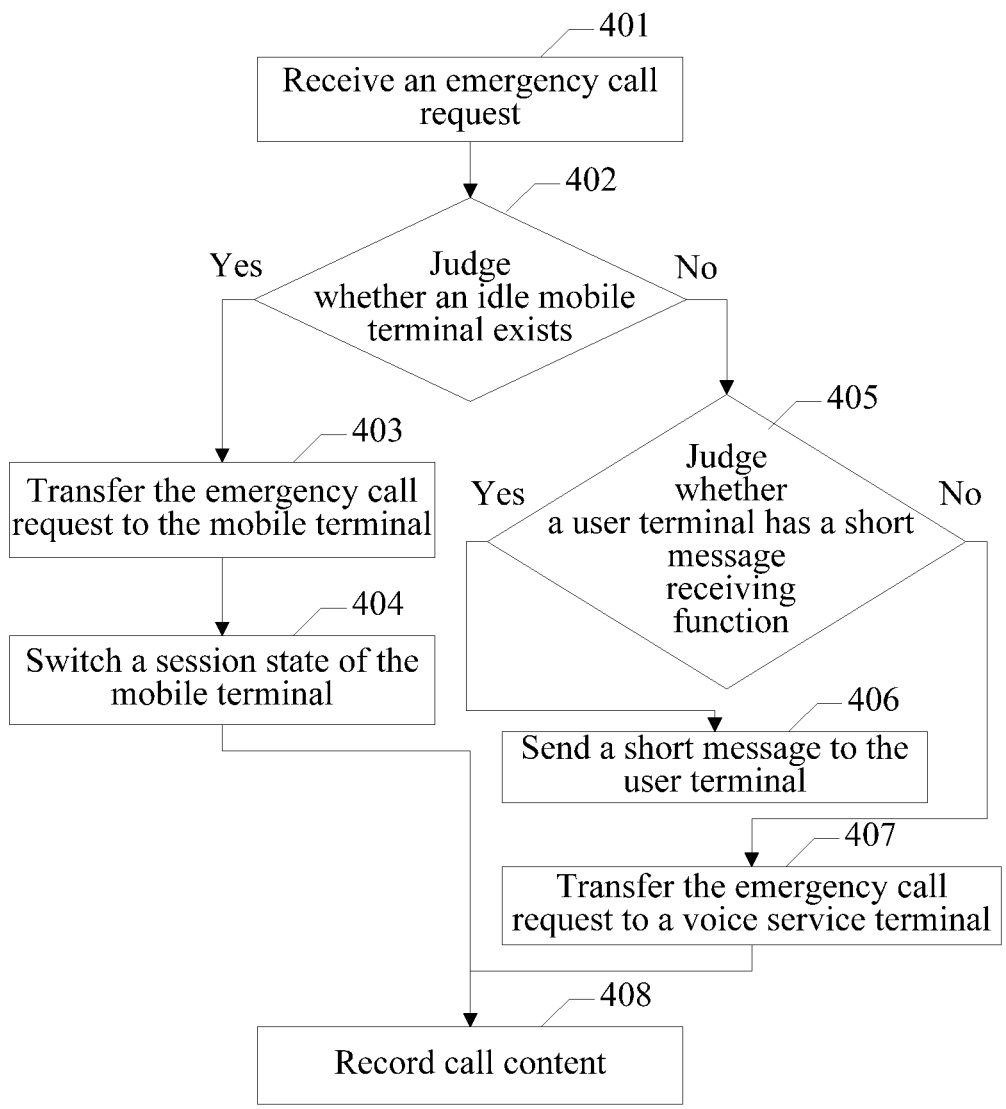
FIG. 4 is another schematic flow chart of an emergency call processing method according to an embodiment of the present invention.

An emergency call processing terminal in an embodiment of the present invention further provides various functions for recording information, and referring to FIG. 4, an embodiment of an emergency call processing method in the embodiment of the present invention includes:

401: Receive an emergency call request.

The emergency call processing terminal receives, through a base station (BTS), an emergency call request sent from a user terminal.

The emergency call processing terminal may set several numbers as emergency call numbers, and when the user terminal dials these emergency call numbers, the emergency call processing terminal performs corresponding emergency call processing (as described in subsequent steps).

At the same time, the emergency call processing terminal may also use some emergency calls specified in a GSM, a call of this kind has signaling different from signaling of an ordinary call, an emergency call request of this kind carries an emergency call identifier, and when a user dials this kind of number carrying the emergency call identifier, the emergency call processing terminal also performs the corresponding emergency call processing.

402: Judge whether an idle mobile terminal exists.

Determine whether a mobile terminal of which a session state is idle exists in a locally-stored emergency mobile terminal group. If the mobile terminal of which the session state is idle exists, 403 is triggered. If the mobile terminal of which the session state is idle does not exist, 405 is triggered.

403: Transfer the emergency call request to a mobile terminal.

When the mobile terminal of which the session state is idle exists in the locally-stored emergency mobile terminal group, the emergency call processing terminal designates one mobile terminal in the mobile terminal of which the session state is idle, and transfers, through the BTS, the emergency call request to the mobile terminal designated by the emergency call processing terminal, so that the user terminal establishes, with the designated mobile terminal, a call connection.

404: Switch a session state of the mobile terminal.

After the emergency call processing terminal transfers, through the BTS, the emergency call request to the designated mobile terminal, and the user terminal establishes, with the designated mobile terminal, the call connection, a locally-stored session state of the designated mobile terminal is switched to a busy session state, and 408 is triggered.

405: Judge whether the user terminal has a short message receiving function.

The emergency call processing terminal determines whether the user terminal has a short message receiving function (for example: determines whether the user terminal is a fixed-line terminal or a mobile terminal). If the user terminal has the short message receiving function, 406 is triggered. If the user terminal does not have the short message receiving function, 407 is triggered.

406: Send a short message to the user terminal.

The emergency call processing terminal sends the short message to the user terminal, to notify the user terminal that the emergency call processing terminal is busy.

The emergency call processing terminal in the present invention presets a function of automatically replying with a short message. When all mobile terminals in the emergency mobile terminal group are in a busy session state, the emergency call processing terminal replies to the user terminal with a short message. Content of the short message is prompt content, which may be used to give a prompt of currently being busy and/or of a subsequent operation procedure.

407: Transfer the emergency call request to a voice service terminal.

The emergency call processing terminal transfers the emergency call request to a voice service terminal of the emergency call processing terminal, establishes a call connection, and notifies, through the voice service terminal, the user terminal that the emergency call processing terminal is busy.

The emergency call processing terminal in the present invention includes the voice service terminal, and the voice service terminal may be an automatic voice service terminal, or a human voice service terminal. When the emergency call request is transferred to the voice service terminal of the emergency call processing terminal, if it is an automatic voice service terminal, a reply of the prompt content is given to the user; and if it is a human voice service terminal, a staff member in an emergency call center provides a service for the user.

408: Record call content.

After the user terminal establishes, with the designated mobile terminal or the voice service terminal, the call connection, the emergency call processing terminal records a number of the user terminal, which mobile terminal the user terminal specifically establishes the call connection with, time when the user terminal sends the emergency call request, a locally processing state of the emergency call request (accessed the mobile terminal successfully, or accessed the voice service terminal), and so on. The emergency call processing terminal may provide a graphical user interface (GUI) for an operator, to provide, in a visualized manner, the operator with recorded information.

After the user terminal establishes, with the designated mobile terminal or the voice service terminal, the call connection, the emergency call processing terminal starts a voice recording function to make a voice record of a call process. The voice record may provide a voice record playback function for the operator, so that the operator may perform monitoring on a rescue operation. At the same time, if the user terminal is transferred to the automatic voice service terminal, information of the voice record of the user may be processed immediately when the operator is free, to notify a disaster relief team of starting the rescue operation.

Figure 5:
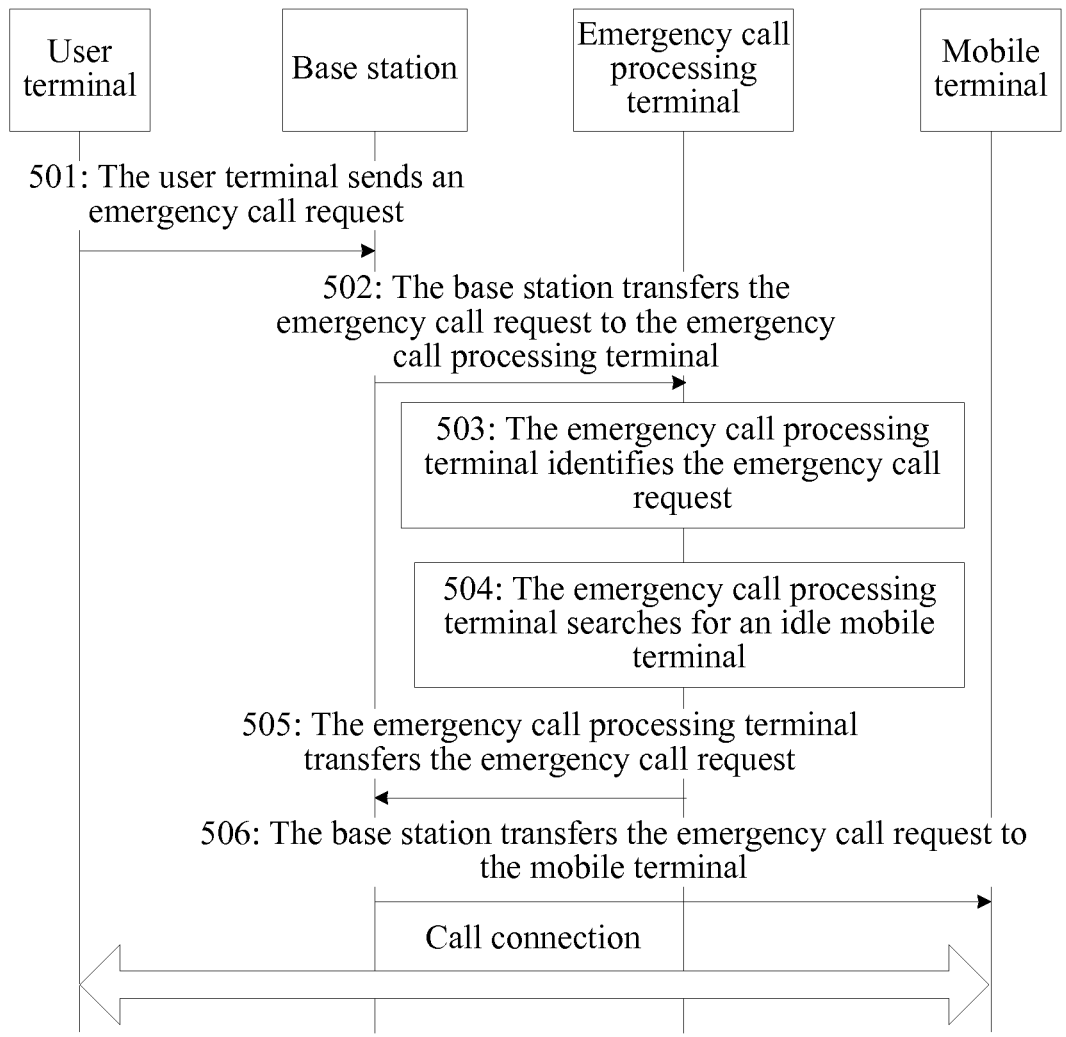
FIG. 5 is a signaling flow chart of an emergency call processing method according to an embodiment of the present invention.

To facilitate understanding, a specific application scenario is used to further describe the emergency call processing method in the foregoing embodiment, referring to FIG. 5.

501: A user terminal sends an emergency call request.

The user terminal dials an emergency call number, and sends an emergency call request to an emergency call processing terminal, where the emergency call number is set by the emergency call processing terminal.

502: A base station transfers the emergency call request to the emergency call processing terminal.

The base station receives an emergency call request signal sent from the user terminal, searches for an emergency call processing terminal near the base station, and after the searching succeeds, transfers the emergency call request to the emergency call processing terminal.

503: The emergency call processing terminal identifies the emergency call request.

The emergency call processing terminal receives the emergency call request sent from the user terminal.

After receiving a call request, the emergency call processing terminal first judges whether the call request carries an emergency call identifier, or judges whether the call request is a locally-preset emergency call number; and if the call request carries the emergency call identifier or is the locally-preset emergency call number, determines that the call request is the emergency call request, and performs corresponding emergency call processing on the call request.

504: The emergency call processing terminal searches for an idle mobile terminal.

The emergency call processing terminal judges whether a mobile terminal of which a session state is idle exists in a locally-stored emergency mobile terminal group; if the mobile terminal of which the session state is idle exists, designates one mobile terminal in the mobile terminal of which the session state is idle (a mobile terminal closest to the user terminal may be designated by using a positioning method), and triggers 505 to transfer the emergency call request to the mobile terminal; and if the mobile terminal of which the session state is idle does not exist, notifies the user terminal that the emergency call processing terminal is busy.

505: The emergency call processing terminal transfers the emergency call request.

The emergency call processing terminal transfers, through the BTS, the emergency call request to the mobile terminal designated by the emergency call processing terminal, so that the user terminal establishes, with the designated mobile terminal, a call connection.

506. The base station transfers the emergency call request to the mobile terminal.

The base station transfers, according to an address of a target terminal designated by the emergency call processing terminal, the emergency call request to the mobile terminal designated by the emergency call processing terminal, so that the user terminal establishes, with the designated mobile terminal, the call connection.

Application scenarios in the embodiments of the present invention are illustrated through some examples, and it may be understood that, in actual applications, there may be more application scenarios, which is not specifically limited here.

Figure 6:
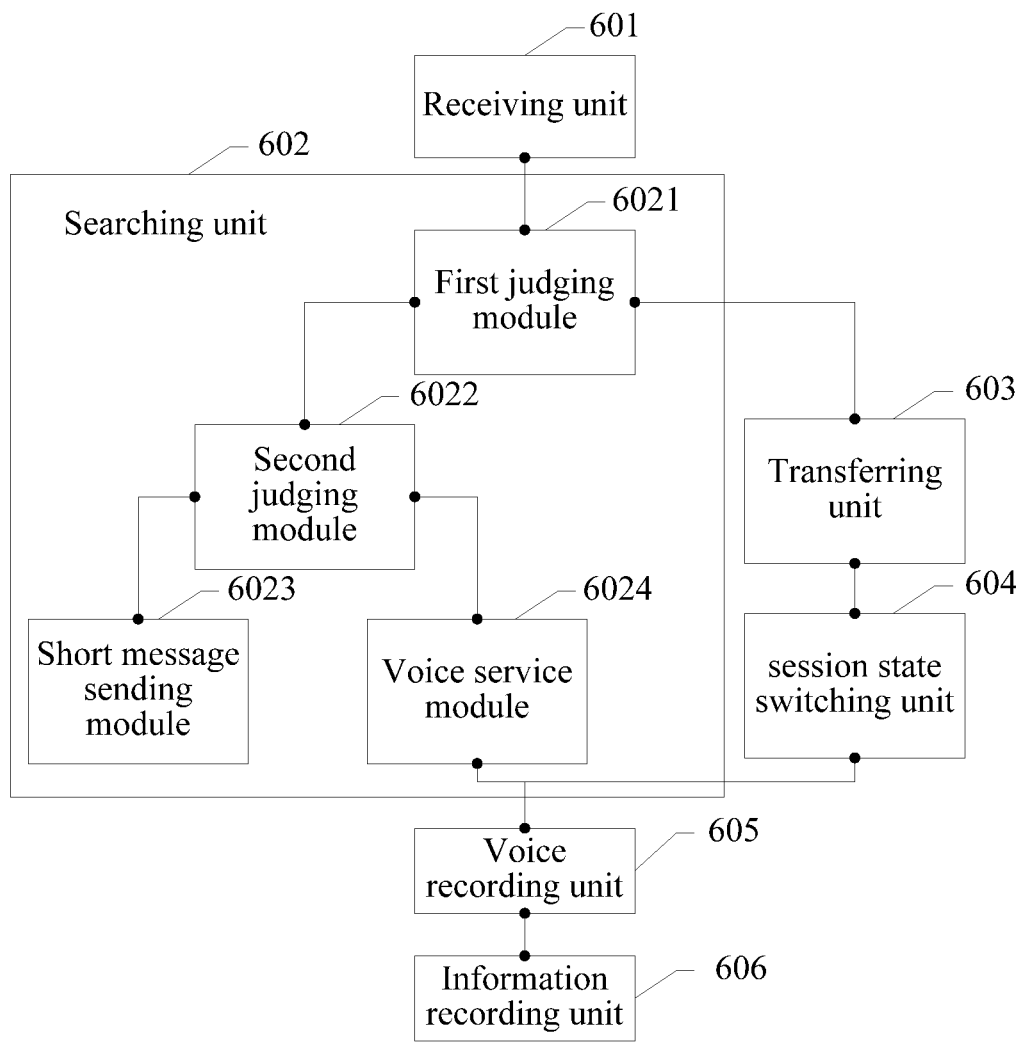
FIG. 6 is a schematic diagram of a logical structure of an emergency call processing terminal according to an embodiment of the present invention.

An embodiment of an emergency call processing terminal that is in the present invention and executes the foregoing emergency call processing method is illustrated in the following, the emergency call processing terminal in the embodiment of the present invention may specifically be a computer or a digital signal processing device, and for its logical structure, reference may be made to FIG. 6. An embodiment of the emergency call processing terminal in the embodiment of the present invention includes: a receiving unit 601, a searching unit 602 and a transferring unit 603.

The receiving unit 601 is configured to receive, through a base station BTS, an emergency call request sent from a user terminal.

The searching unit 602 is configured to search, in a locally-stored emergency mobile terminal group, for a mobile terminal of which a session state is idle.

The transferring unit 603 is configured to transfer the emergency call request to the mobile terminal through the BTS, and establish a call connection.

The searching unit 602 in the embodiment of the present invention may include: a first judging module 6021, a second judging module 6022, a short message sending module 6023 and a voice service module 6024.

The first judging module 6021 is configured to determine whether the mobile terminal of which the session state is idle exists in the locally-stored emergency mobile terminal group; if the mobile terminal of which the session state is idle exists, trigger the transferring unit; and if the mobile terminal of which the session state is idle does not exist, trigger the second judging module.

The second judging module 6022 is configured to determine whether the user terminal has a short message receiving function. If the user terminal has the short message receiving function, trigger the short message sending module. If the user terminal does not have the short message receiving function, trigger the voice service module.

The short message sending module 6023 is configured to send a short message to the user terminal, to notify the user terminal that the emergency call processing terminal is busy.

The voice service module 6024 is configured to transfer the emergency call request to a voice service terminal of the emergency call processing terminal, establish a call connection, and notify, through the voice service terminal, the user terminal that the emergency call processing terminal is busy.

The emergency call processing terminal in the embodiment of the present invention may further include: a session state switching unit 604, a voice recording unit 605 and an information recording unit 606.

The session state switching unit 604 is configured to, after the transferring unit transfers the emergency call request to the mobile terminal through the BTS, switch the session state of the mobile terminal to a busy session state.

The voice recording unit 605 is configured to, after the call connection is established with the user terminal, make a voice record of a call process.

The information recording unit 606 is configured to, after the call connection is established with the user terminal, record a number of the user terminal, time when the emergency call request is sent, and a processing state of the emergency call request.

A specific interaction process of the units in the emergency call processing terminal in the embodiment of the present invention is described in the following.

After the user terminal sends the emergency call request, the receiving unit 601 of the emergency call processing terminal receives, through the BTS, the emergency call request sent from the user terminal. The emergency call processing terminal may set several numbers as emergency call numbers. When the user terminal dials these emergency call numbers, the emergency call processing terminal triggers that the searching unit 602 performs corresponding emergency call processing. At the same time, the emergency call processing terminal may also use some emergency calls specified in a GSM. A call of this kind has signaling different from signaling of an ordinary call. An emergency call request of this kind carries an emergency call identifier. When a user dials this kind of number carrying the emergency call identifier, the emergency call processing terminal also performs the corresponding emergency call processing.

The first judging module 6021 of the searching unit 602 determines whether the mobile terminal of which the session state is idle exists in the locally-stored emergency mobile terminal group. If the mobile terminal of which the session state is idle exists, the transferring unit 603 is triggered. If the mobile terminal of which the session state is idle does not exist, it is triggered that the second judging module 6022 determines whether the user terminal has the short message receiving function.

If the user terminal has the short message receiving function, it is triggered that the short message sending module 6023 sends the short message to the user terminal, to notify the user terminal that the emergency call processing terminal is busy. Content of the short message may be: "Sorry, the emergency call processing terminal is busy now, please redial later, or reply with your name, help seeking content and a help seeking site in a short message." If the user terminal does not have the short message receiving function, it is triggered that the voice service module 6024 transfers the emergency call request to the voice service terminal of the emergency call processing terminal, establishes a call connection, and notifies, through the voice service terminal, the user terminal that the emergency call processing terminal is busy. The voice service terminal may be an automatic voice service terminal, or a human voice service terminal.

When the emergency call request is transferred to the voice service terminal of the emergency call processing terminal, if it is an automatic voice service terminal, the automatic voice service terminal replies to the user with content such as: "Sorry, the emergency call processing terminal is busy now, please redial later, or reply with your name, help seeking content and a help seeking site in a short message." If it is a human voice service terminal, a staff member in an emergency call center provides a service for the user. After the call connection is established, the voice recording unit 605 and the information recording unit 606 are triggered.

Optionally, in the embodiment of the present invention, when the mobile terminal of which the session state is idle does not exist in the locally-stored emergency mobile terminal group, it may be directly triggered, without the judgment of the second judging module 6022, that the voice service module 6024 transfers the emergency call request to the voice service terminal of the emergency call processing terminal.

If the mobile terminal of which the session state is idle exists in the locally-stored emergency mobile terminal group, the transferring unit 603 designates one mobile terminal in the mobile terminal of which the session state is idle, and transfers, through the BTS, the emergency call request to the mobile terminal designated by the emergency call processing terminal, so that the user terminal establishes, with the designated mobile terminal, a call connection.

After the user terminal establishes, with the designated mobile terminal, the call connection, it is triggered that the session state switching unit 604 switches the session state of the mobile terminal to a busy session state, and the voice recording unit 605 and the information recording unit 606 are triggered.

After the call connection is established, the voice recording unit 605 makes the voice record of the call process, and the voice record may provide a voice record playback function for an operator, so that the operator performs monitoring on a rescue operation. At the same time, if the user terminal is transferred to the automatic voice service terminal, information of the voice record of the user may be processed immediately when the operator is free, to notify a disaster relief team of starting the rescue operation. The information recording unit 606 records the number of the user terminal, which mobile terminal the call connection is specifically established with, the time when the user terminal sends the emergency call request, a locally processing state of the emergency call request (accessed the mobile terminal successfully, or accessed the voice service terminal), and so on. The emergency call processing terminal may provide a graphical user interface for an operator, to provide, in a visualized manner, the operator with recorded information.

Figure 7:
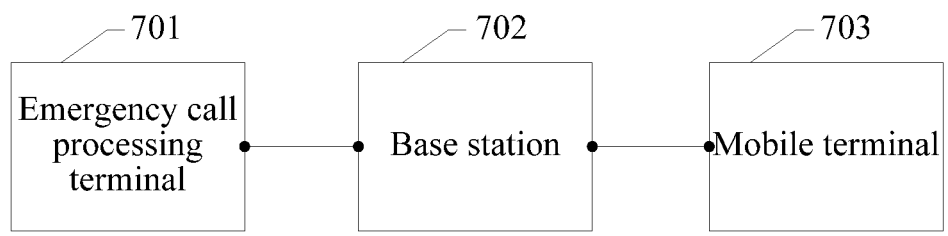
FIG. 7 is a schematic diagram of a logical structure of an emergency call processing system according to an embodiment of the present invention.

An embodiment of an emergency call processing system that is in the present invention and executes the foregoing emergency call processing method is illustrated in the following, and for its logical structure, reference may be made to FIG. 7. An embodiment of the emergency call processing system in the embodiment of the present invention includes an emergency call processing terminal 701, configured to receive, through a base station BTS, an emergency call request sent from a user terminal; search, in a locally-stored emergency mobile terminal group, for a mobile terminal of which a session state is idle; and transfer the emergency call request to the mobile terminal through the BTS, and establish a call connection, the base station 702, configured to transfer, to the emergency call processing terminal, the emergency call request sent from the user terminal, and transfer the emergency call request to a mobile terminal designated by the emergency call processing terminal, so that the user terminal establishes, with the mobile terminal, the call connection, and the mobile terminal 703, configured to establish, with the user terminal, the call connection.

The emergency call processing system in the embodiment of the present invention is applied to the foregoing embodiment described in FIG. 5.

Persons skilled in the art may clearly understand that, for convenience and conciseness of description, reference may be made to corresponding processes in the foregoing method embodiments for specific working processes of the system, apparatus and units in the foregoing descriptions, which are not repeatedly described here.

In several embodiments provided in this application, it should be understood that the disclosed system, apparatus and method may be implemented in other manners. For example, the foregoing described apparatus embodiment is only exemplary, for example, division of the units is only a kind of division of logical functions, and there may be other division manners in actual implementation, for example, multiple units or components may be combined or integrated into another system, or some features may be omitted, or not executed. Additionally, the shown or discussed mutual coupling or direct coupling or communication connection may be indirect coupling or communication connection through some interfaces; a connection between apparatuses or units may be electrical, mechanical, or of another form.

The units illustrated as separated parts may be or may not be separated physically, and parts shown as units may be or may not be physical units, that is, may be located at a same place, or may be distributed to multiple network units. Part or all of the units may be selected to implement the objective of the solution of this embodiment according to actual requirements.

In addition, in each embodiment of the present invention, various functional units may be integrated in one processing unit, each unit may also physically exist independently, and two or more than two units may also be integrated in one unit. The integrated unit may be implemented in a form of hardware, and may also be implemented in a form of a software functional unit.

If the integrated unit is implemented in the form of the software functional unit and is sold or used as an independent product, it may be stored in a computer readable storage medium. Based on such understanding, the essence of the technical solutions of the present invention or part that makes contributions to the prior art, or all or part of the technical solutions may be embodied in a form of a software product. The computer software product may be stored in a storage medium, and includes several instructions to enable a computer device (which may be a personal computer, a server, or a network device, and so on) to perform all or part of the steps of the method described in each embodiment of the present invention. The storage medium includes various media capable of storing program codes, such as a USB flash drive, a removable hard disk, a read-only memory (ROM, Read-Only Memory), a random access memory (RAM, Random Access Memory), a magnetic disk or an optical disk.

The foregoing descriptions are merely specific implementation manners of the present invention, but not intended to limit the protection scope of the present invention. Any variation or replacement that may be easily derived by persons skilled in the art within the technical scope disclosed in the present invention shall fall within the protection scope of the present invention. Therefore, the protection scope of the present invention is subject to the protection scope of the appended claims.

What is claimed is:

1. An emergency call processing method, comprising:
   receiving, by an emergency call processing terminal, an emergency call request sent from a user terminal through a base station;
   searching, by the emergency call processing terminal, for a mobile terminal of which a session state is idle in a locally-stored emergency mobile terminal group; and
   transferring, by the emergency call processing terminal, the emergency call request to the mobile terminal through the base station, so that the user terminal establishes a call connection with the mobile terminal;
   wherein searching for the mobile terminal comprises:
      determining, by the emergency call processing terminal, whether the mobile terminal of which the session state is idle exists in the locally-stored emergency mobile terminal group;
      triggering, by the emergency call processing terminal, a step of transferring the emergency call request to the mobile terminal if the mobile terminal of which the session state is idle exists; and
      notifying, by the emergency call processing terminal, the user terminal that the emergency call processing terminal is busy if the mobile terminal of which the session state is idle does not exist.

2. The method according to claim 1, wherein notifying the user terminal that the emergency call processing terminal is busy comprises:
   transferring, by the emergency call processing terminal, the emergency call request to a voice service terminal, so that the user terminal establishes, with the voice service terminal, a call connection; and
   notifying the user terminal that the emergency call processing terminal is busy through the voice service terminal.

3. The method according to claim 1, wherein the notifying the user terminal that the emergency call processing terminal is busy comprises:
   determining, by the emergency call processing terminal, whether the user terminal has a short message receiving function;
   sending, by the emergency call processing terminal, a short message to the user terminal to notify the user terminal that the emergency call processing terminal is busy if the user terminal has the short message receiving function; and
   if the user terminal does not have the short message receiving function, transferring, by the emergency call processing terminal, the emergency call request to a voice service terminal, establishing a call connection, and notifying the user terminal that the emergency call processing terminal is busy through the voice service terminal.

4. The method according to claim 1, further comprising:
   switching, by the emergency call processing terminal, the session state of the mobile terminal to a busy session state.

5. The method according to claim 1, further comprising:
   recording, by the emergency call processing terminal, a voice of a call process.

6. The method according to claim 1, further comprising:
   recording, by the emergency call processing terminal, a number of the user terminal, time when the emergency call request is sent, and a processing state of the emergency call request.

7. An emergency call processing terminal, comprising:
   a receiver, configured to receive an emergency call request sent from a user terminal through a base station;

a processor, configured to search for a mobile terminal of which a session state is idle in a locally-stored emergency mobile terminal group; and a transmitter, configured to transfer the emergency call request to the mobile terminal through the base station, so that the user terminal establishes a call connection with the mobile terminal;

wherein the processor is further configured to determine whether the mobile terminal of which the session state is idle exists in the locally-stored emergency mobile terminal group; to transfer the emergency call request to the mobile terminal if the mobile terminal of which the session state is idle exists; to determine whether the user terminal has a short message receiving function if the mobile terminal of which the session state is idle does not exist; to send a short message to the user terminal in order to notify the user terminal that the emergency call processing terminal is busy if the user terminal has the short message receiving function; and to transfer the emergency call request to a voice service terminal of the emergency call processing terminal, establish a call connection, and notify the user terminal that the emergency call processing terminal is busy through the voice service terminal if the user terminal does not have the short message receiving function.

8. The terminal according to claim 7, wherein the processor is further configured to switch the session state of the mobile terminal to a busy session state after transferring the emergency call request to the mobile terminal through the base station.

9. The terminal according to claim 7, wherein the processor is further configured to record a voice of a call process after the call connection is established with the user terminal.

10. The terminal according to claim 7, wherein the processor is further configured to record a number of the user terminal, time when the emergency call request is sent, and a processing state of the emergency call request after the call connection is established with the user terminal.

11. The terminal according to claim 7, wherein the transmitter is further configured to transfer the emergency call request to a voice service terminal, so that the user terminal establishes, with the voice service terminal, a call connection and notify the user terminal that the emergency call processing terminal is busy through the voice service terminal.

12. The terminal according to claim 7, wherein:
the processor is further configured to determine whether the user terminal has a short message receiving function;
the transmitter is further configured to send a short message to the user terminal to notify the user terminal that the emergency call processing terminal is busy if the user terminal has the short message receiving function; and
if the user terminal does not have the short message receiving function, the transmitter is further configured to transfer the emergency call request to a voice service terminal, the processor is further configured to establish a call connection, and the transmitter is further configured to notify the user terminal that the emergency call processing terminal is busy through the voice service terminal.

13. An emergency call processing system, comprising:
an emergency call processing terminal communicate with a mobile terminal through a base station;
wherein the emergency call processing terminal is configured to receive, through the base station, an emergency call request sent from a user terminal; to search, in a locally-stored emergency mobile terminal group, for a mobile terminal of which a session state is idle, and to transfer the emergency call request to the mobile terminal through the base station, so that the user terminal establishes a call connection with the mobile terminal;

wherein the base station is configured to transfer, to the emergency call processing terminal, the emergency call request sent from the user terminal and to transfer the emergency call request to a mobile terminal designated by the emergency call processing terminal so that the user terminal establishes the call connection with the mobile terminal; and wherein the mobile terminal is configured to establish the call connection with the mobile terminal;

wherein the emergency call processing terminal is further configured to determine whether the mobile terminal of which the session state is idle exists in the locally-stored emergency mobile terminal group, to transfer the emergency call request to the mobile terminal through the base station if the mobile terminal of which the session state is idle exists, to determine whether the user terminal has a short message receiving function if the mobile terminal of which the session state is idle does not exist, to send a short message to the user terminal in order to notify the user terminal that the emergency call processing terminal is busy if the user terminal has the short message receiving function; and to, if the user terminal does not have the short message receiving function, transfer the emergency call request to a voice service terminal of the emergency call processing terminal, establish a call connection, and notify the user terminal that the emergency call processing terminal is busy through the voice service terminal.

14. The system according to claim 13, wherein the emergency call processing terminal is further configured to switch the session state of the mobile terminal to a busy session state after transferring the emergency call request to the mobile terminal through the base station.

15. The system according to claim 13, wherein the emergency call processing terminal is further configured to record a voice of a call process after the call connection is established with the user terminal.

16. The system according to claim 13, wherein the emergency call processing terminal is further configured to record a number of the user terminal, time when the emergency call request is sent, and a processing state of the emergency call request after the call connection is established with the user terminal.

17. The system according to claim 13, wherein the emergency call processing terminal is further configured to transfer the emergency call request to a voice service terminal, so that the user terminal establishes, with the voice service terminal, a call connection and notify the user terminal that the emergency call processing terminal is busy through the voice service terminal.

18. The system according to claim 13, wherein,
the emergency call processing terminal is further configured to determine whether the user terminal has a short message receiving function and send a short message to the user terminal to notify the user terminal that the emergency call processing terminal is busy if the user terminal has the short message receiving function; and
if the user terminal does not have the short message receiving function, the emergency call processing terminal is further configured to transfer the emergency call request to a voice service terminal, establish a call connection, and notify the user terminal that the emergency call processing terminal is busy through the voice service terminal.

19. A computer readable medium comprising a computer program stored in a non-transitory medium that, when executed by a digital processor of an emergency call processing terminal, causes the processor to perform operations comprising:

receiving an emergency call request sent from a user terminal through a base station;

searching for a mobile terminal of which a session state is idle in a locally-stored emergency mobile terminal group; and transferring the emergency call request to the mobile terminal through the base station, so that the user terminal establishes a call connection with the mobile terminal;

wherein the computer readable medium, when executed by the digital processor of the emergency call processing terminal, causes the processor to perform further operations comprising:

determining whether the mobile terminal of which the session state is idle exists in the locally-stored emergency mobile terminal group;

triggering a step of transferring the emergency call request to the mobile terminal if the mobile terminal of which the session state is idle exists; and notifying the user terminal that the emergency call processing terminal is busy if the mobile terminal of which the session state is idle does not exist.

20. The computer readable medium according to claim 19, wherein the computer readable medium, when executed by the digital processor of the emergency call processing terminal, causes the processor to perform further operations comprising:

transferring the emergency call request to a voice service terminal, so that the user terminal establishes, with the voice service terminal, a call connection, and notifying the user terminal that the emergency call processing terminal is busy through the voice service terminal.

21. The computer readable medium according to claim 19, wherein the computer readable medium, when executed by the digital processor of the emergency call processing terminal, causes the processor to perform further operations comprising:

determining whether the user terminal has a short message receiving function;

sending a short message to the user terminal, to notify the user terminal that the emergency call processing terminal is busy when the user terminal has the short message receiving function; and when the user terminal does not have the short message receiving function, transferring the emergency call request to a voice service terminal, establishing a call connection, and notifying the user terminal that the emergency call processing terminal is busy through the voice service terminal.

* * * * *